United States Patent [19]

Russell

[11] Patent Number: 5,542,751
[45] Date of Patent: Aug. 6, 1996

[54] GRIP RING WHEEL COVER RETENTION SYSTEM

[75] Inventor: Martin E. Russell, Hendersonville, Tenn.

[73] Assignee: Del-Met Corporation, Hendersonville, Tenn.

[21] Appl. No.: 252,087

[22] Filed: Jun. 1, 1994

[51] Int. Cl.⁶ .................................................. B60B 7/12
[52] U.S. Cl. ................................. 301/37.32; 301/37.36
[58] Field of Search ........................... 301/37.1, 37.24, 301/37.31, 37.32, 37.35, 37.36, 37.34, 37.42; 29/894.38, 894.381

[56] References Cited

U.S. PATENT DOCUMENTS

| | | | |
|---|---|---|---|
| 3,851,923 | 12/1974 | Beisch | 301/37.24 |
| 3,876,257 | 4/1975 | Buerger . | |
| 4,427,238 | 1/1984 | Connell | 301/37.24 X |
| 4,438,979 | 3/1984 | Renz et al. | 301/37.36 |
| 4,461,514 | 7/1984 | Schwarz | 301/37.42 X |
| 4,603,914 | 8/1986 | Brown et al. | 301/37.34 X |

FOREIGN PATENT DOCUMENTS 3319229  11/1984  Germany ................ 301/37.34

*Primary Examiner*—Russell D. Stormer
*Attorney, Agent, or Firm*—Natter & Natter

[57] ABSTRACT

A wheel cover grip ring includes a plurality of axial legs which engage the rim of a wheel. The grip ring is formed of a metal band having a plurality of spaced flukes. The flukes serve to anchor the grip ring between a pair of annular concentric walls of a channel on an axially inner face of a plastic wheel cover. Each leg is bent to form a smooth, non-scratch articulated latch adjacent its free end. The articulated latch includes an engagement leaf having an angle of approximately 45 degrees to the wheel axis and which slidingly engages the wheel rim when the wheel cover is mounted. The latch also includes a curved latch seat which engages a draw bead step in the wheel rim. The latch also includes a retraction leaf having an angle of approximately 30 degrees to the wheel axis. The flukes provide self seating of the grip ring in the channel when the cover is first mounted to a wheel. The retraction leaf engages the wheel rim at a different angle than the engagement leaf to provide resistance to dislodgement of the wheel cover.

15 Claims, 2 Drawing Sheets

GRIP RING WHEEL COVER RETENTION SYSTEM

BACKGROUND OF THE INVENTION

1. Field of the Invention

This invention relates generally to wheel cover retention systems and more particularly to a grip ring system having non-scratch wheel rim engagement.

2. Background History

The implementation of metal grip rings for mounting plastic wheel covers in automotive applications was exemplified in U.S. Pat. No. 3,876,257 issued to the assignee of the present invention. Disclosed in such patent was a plastic wheel cover having an annular channel on its inner face. Seated in the channel was a metal grip ring having a plurality of axially extending legs with the distal portion of each leg being radially outwardly bent to form sharp edged wheel rim engaging tooth. The edges of each tooth, and especially the corners thereof, were configured with sharp relatively hard points to retain the wheel cover in position.

In order to accommodate dimensional variations in the axial depth of the wheel rim within tolerance limits, every other leg was shorter in length than the adjacent leg. The teeth of the short legs preferably engaged the wheel rim axially short of a hollow draw bead step and the teeth of the long legs preferably engaged the draw bead step.

While such grip ring structure gained widespread acceptance, the retention system suffered from certain disadvantages. The sharp edged teeth often scratched paint from the surface of the wheel rim, exposing the steel rim to moisture and road salts which resulted in accelerated corrosion of the exposed wheel rim surfaces.

Further, since the axial depth the legs projected into the wheel rim was fixed by the seating of the grip ring at the bottom of the wheel cover channel, the retention system did not readily accommodate the wide axial tolerance permitted in wheel rims. In some instances, where the axial depth of the draw bead step varied, the teeth of the long legs did not engage the draw bead step. In other instances, within tolerance dimensional wheel rim diameter variations resulted in radially inward deflection of the short legs such that the grip ring distorted to the extent that the long legs did not contact the wheel rim.

In addition, when wheels with mounted wheel covers were subjected to tramp testing in simulation of repeated pot hole engagement, for determining whether extreme driving conditions would dislodge a wheel cover, internal stresses on the wheel cover grip ring channel walls resulted in stress cracks and fractures in the plastic wheel cover, particularly in spoke or bridge areas which separated vent openings.

Rather than utilize thicker or reenforced plastic wheel covers to withstand the internal stresses, it occurred to Applicant that if the length of each leg of a grip ring could be adjustably fixed to conform to the particular axial depth dimensions of a wheel rim, one would be assured that the length of each leg was appropriate to assure proper seating in a wheel rim draw bead step. It further occurred to Applicant that internal stresses may be reduced without significant loss of retentive strength by providing fewer legs which would engage only the draw bead step and by altering the nature of the engagement between the grip ring legs and the wheel rim draw bead step.

SUMMARY OF THE INVENTION

A wheel cover includes on its inner face, a pair of concentric axially outwardly projecting walls which define a channel. A metal grip ring is seated in the channel. The grip ring is formed of a band having a base longitudinal edge with a plurality of spaced radially projecting flukes which engage the outer wall of the channel to anchor the grip ring in the channel.

The grip ring includes a plurality of smooth non-scratch legs which project axially outwardly from its opposite longitudinal edge with each leg being bent radially outwardly to form a cantilever articulated latch. Each latch includes an engagement leaf which extends from the leg radially outwardly and axially inwardly at an angle of approximately 45 degrees to the wheel axis for smooth engagement with a wheel rim when the wheel cover is being mounted to the wheel.

From the engagement leaf, the latch includes a curved latch seat which interconnects the engagement leaf with a retraction leaf having an angle of approximately 30 degrees to the wheel axis which extends radially and axially inwardly relative to the wheel cover. The curved latch seat is configured to snap into a draw bead step formed in the wheel rim with the retraction leaf being angled and configured to provide scratch free resistance against axial withdrawal of the wheel cover.

Prior to the initial mounting of each wheel cover to its respective wheel, the wheel cover is assembled with the grip ring only partially seated in the wheel cover channel. The grip ring seats itself deeper into the channel when the wheel cover is first mounted to the wheel rim. This assures proper length adjustment of the grip ring legs such that the latch seats are positioned for snap in engagement with the draw bead step when the wheel cover is fully mounted.

From the foregoing compendium, it will be appreciated that it is a consideration of the present invention to provide a grip ring retention system of the general character described for a plastic wheel cover which is not subject to the disadvantages of the background history aforementioned.

An aspect of the present invention is to provide a grip ring retention system of the general character described for a plastic wheel cover which generates reduced internal stresses on the wheel cover.

A feature of the present invention is to provide a grip ring retention system of the general character described for a plastic wheel cover which is well adapted for implementation with lightweight low cost injection molded plastic wheel covers.

A further consideration of the present invention is to provide a grip ring retention system of the general character described for a plastic wheel cover which will not scratch painted wheel surfaces.

Another feature of the present invention is to provide a grip ring retention system of the general character described for a plastic wheel cover which is of reduced weight.

Yet another consideration of the present invention is to provide a grip ring retention system of the general character described for a plastic wheel cover which is suitable for low cost economical mass production fabrication.

To provide a grip ring retention system of the general character described for a plastic wheel cover which self adjusts for proper engagement with any number of wheels within axial dimension tolerance limit variations is a further consideration of the present invention.

Another feature of the present invention is to provide a grip ring retention system of the general character described for a plastic wheel cover which reduces stresses generated upon a plastic wheel cover by radial wheel engaging grip legs without significant loss of retentive force.

Other aspects, features and considerations of the present invention in part will be obvious and in part will be pointed out hereinafter.

With these ends in view, the invention finds embodiment in certain combinations of elements, arrangements of parts and series of steps by which the said aspects, features and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings, in which is shown one of the various possible exemplary embodiments of the invention.

DESCRIPTION OF THE PREFERRED EMBODIMENT

Figure 1:
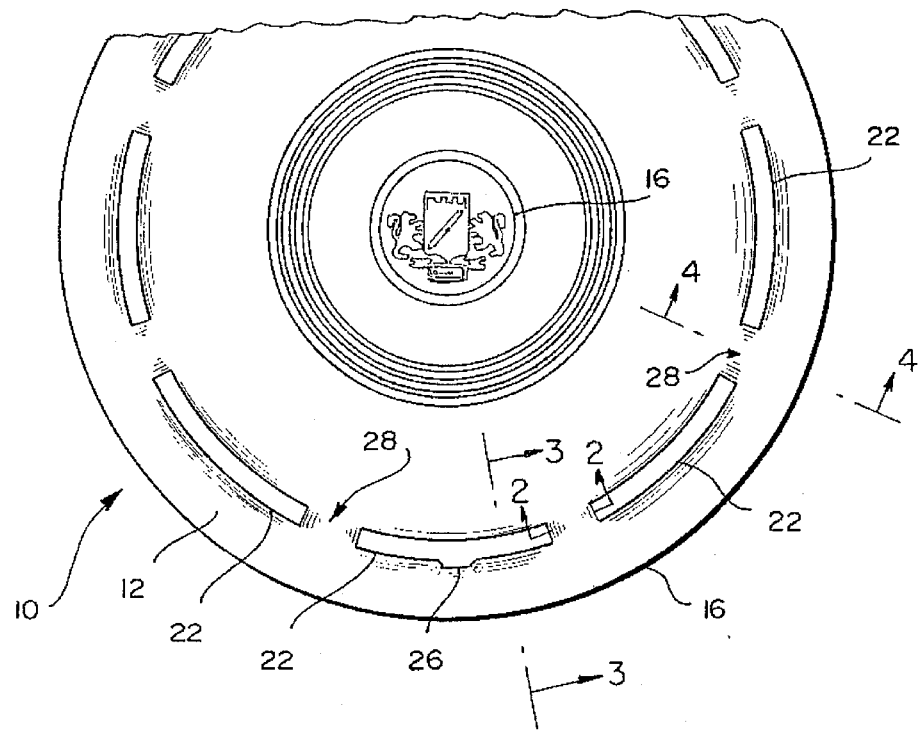
FIG. 1 is a fragmentary front elevational view of a molded plastic wheel cover having a grip ring retention system constructed in accordance with and embodying the invention with the wheel cover being mounted to a wheel, with the wheel and a mounted tire being deleted for clarity.
Figure 2:
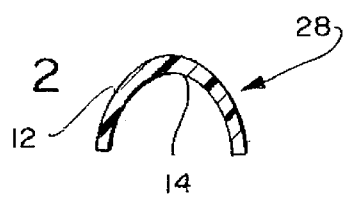
FIG. 2 is an enlarged scale sectional view through the wheel cover, the same being taken substantially along the line 2—2 of FIG. 1 and through a bridge portion of the wheel cover which separates a pair of vent openings.

Referring now in detail to the drawings, the reference numeral 10 denotes generally a molded plastic wheel cover constructed in accordance with and embodying the invention. The wheel cover 10 is generally circular and disk shaped in configuration and includes a contoured outer face 12 to which a suitable surface treatment of paint or chrome finish is applied and an inner face 14, which is oriented toward a vehicle wheel to which the wheel cover is mounted. The wheel cover 10 extends from a circular peripheral lip 16 to a central hub area 18, which may carry a suitable ornament 20. Preferably, the entire wheel cover 10 is molded of one piece plastic construction.

In order to facilitate air cooling of the vehicle wheel and brake rotors or drums as well as related components such as calipers, axles and the like, the wheel cover 10 includes a plurality of vent openings 22 with the outer face 12 being contoured with a walled throat 24 at the periphery of each vent opening 22. One of the vent openings 22 may include a notch 26 for the purpose of accommodating a valve stem (not shown).

Spanning between adjacent vent openings 22, are bridge or web portions 28. The web portions 28 may be convexly curved to provide end walls of the vent opening throats 24.

Figure 3:
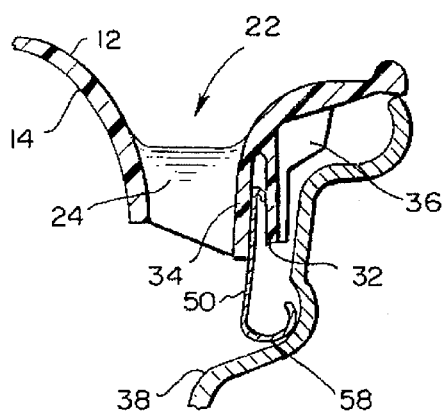
FIG. 3 is an enlarged scale fragmentary sectional view through the wheel cover and a wheel rim portion of the wheel to which the cover is mounted, the same being taken substantially along the line 3—3 of FIG. 1.

In accordance with the invention, a wheel grip ring retaining channel 30 is formed on the inner face 14 of the wheel cover. The channel 30 is defined by an outer axial wall 32 and an inner axial wall 34. Portions of the vent opening throat may coincide with the inner axial wall 34 as illustrated in FIG. 3. The walls 32, 34 are concentric.

A plurality of radial reinforcing flanges 36 extend between the outer axial wall and the inner face 14 and serve, not only to strengthen the outer wall but, in addition, may serve to center the wheel cover as disclosed in U.S. Pat. No. 3,786,257, incorporated herein by reference.

The wheel cover 10 is mounted to a rim 38 of a vehicle wheel by a grip ring 40. The grip ring 40 comprises an elongate strip or band 42 formed of metal such as 20201 or 30301 stainless steel, half hardened and of a thickness in the order of 0.46 mm. Although the grip ring 40 may appear somewhat similar to the grip ring disclosed in U.S. Pat. No. 3,876,257, significant differences in configuration result in distinct advantages pursuant to the present invention.

Figure 4:
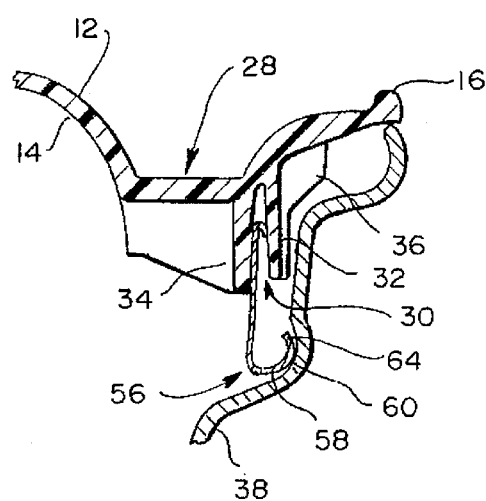
FIG. 4 is an enlarged scale fragmentary sectional view through the wheel cover and the rim portion of the wheel, the same being taken substantially along the line 4—4 of FIG. 1.
Figure 5:
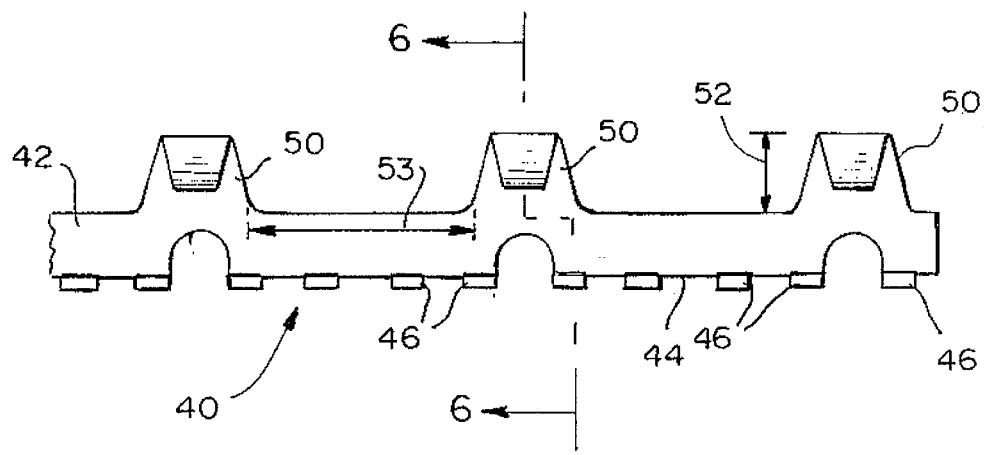
FIG. 5 is a fragmentary elevational view of a grip ring band constructed in accordance with and embodying the invention.
Figure 6:
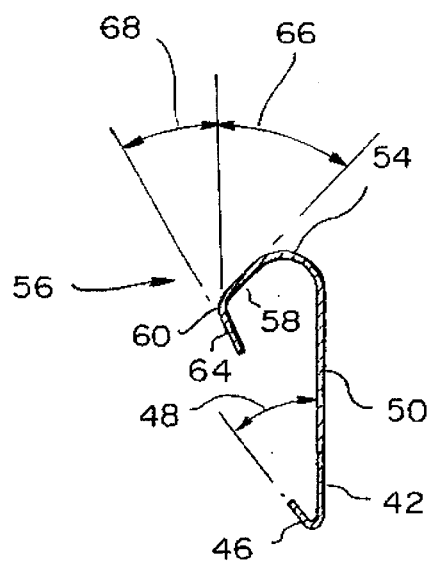
FIG. 6 is an enlarged scale sectional view through a leg portion of the grip ring band, the same being taken substantially along the line 6—6 of FIG. 5 and illustrating an articulated cantilever latch formed adjacent an end of a leg as well as a fluke formed at the base longitudinal edge of the grip ring band.

With attention directed now to FIGS. 5 and 6, it should be noted that the grip ring 40 is formed of an elongate band having a base longitudinal edge 44 from which project a plurality of flukes 46. The flukes 46 extend downwardly from the edge 44 and then upwardly and radially (as viewed in FIGS. 3 and 4) outwardly at an angle 48 of approximately 45 degrees to the longitudinal axis of the wheel. The distal edge of each fluke 46 is preferably sharp and is configured to dig or bite into the inner face of the outer channel wall 32 when the grip ring 40 is seated in the channel 30 to prevent dislodgement of the grip ring from the channel, as depicted in FIGS. 3 and 4. Alternately, barbs or spikes may be provided for anchoring the grip ring in the channel and the anchoring means need not project from the longitudinal edge 44.

From an opposite longitudinal edge of the band 42, a plurality of tapered legs 50 project. The legs 50 extend to a maximum axial length 52 which, as illustrated in FIG. 5, is in the order of, but slightly less than the maximum width of each tapered leg. Further, a distance 53 between adjacent legs is approximately twice the maximum width of each leg. The grip ring 42 has approximately one-half the number of legs as the grip ring disclosed in U.S. Pat. No. 3,876,257.

As will be seen in greater detail from an examination of FIG. 6, each leg 50 is acutely bent at a curve 54 to form a cantilever articulated latch, denoted generally by the reference numeral 56. The edge and corner surfaces of the cantilever articulated latch 56 are relatively smooth to prevent scratching of the wheel finish.

Figure 7:
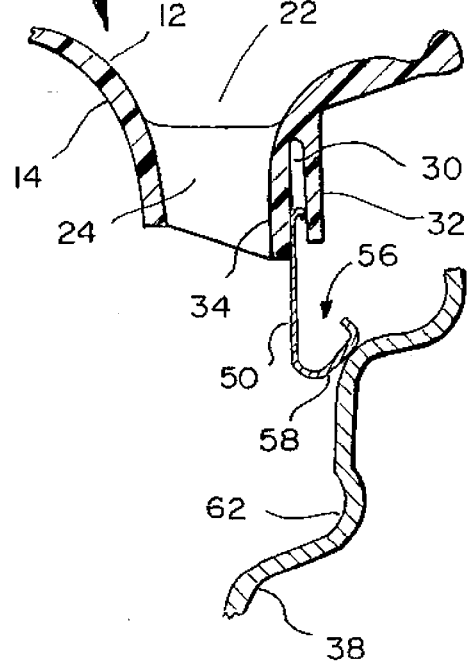
FIG. 7 is an enlarged scale sectional view through the wheel cover similar to that of FIG. 3, but showing the wheel cover and the grip ring as initially assembled, prior to axial adjustment of the grip ring relative to the wheel cover.

The latch 56 includes an engagement leaf 58 which provides a contact surface for deflecting the latch 56 and the leg 50 radially inwardly. The leaf 58 engages the wheel rim 38 when the wheel cover 10 is mounted, as depicted in FIG. 7.

The engagement leaf 58 terminates at a curved latch seat 60 which is configured to snap into engagement with and bear against a concave annular draw bead step 62 formed on the wheel rim 38. A relatively short retraction leaf 64 extends axially inwardly (relative to the wheel cover 10) and radially inwardly from the latch seat 60. The retraction leaf 60 is configured for engagement against the draw bead step 62 and the wheel rim 38 upon removal of the wheel cover 10.

Pursuant to the invention, the engagement leaf 58 is oriented at an angle denoted by the reference numeral 66, in the order of 45 degrees to the axis of both the wheel and the wheel cover to facilitate radially inward flexing of the leg 50 and the entire cantilever articulated latch 56 when mounting the wheel cover.

The retraction leaf 64, on the other hand, is oriented, with respect to the wheel and wheel cover axis at an angle, denoted by the reference numeral 68, in the order of 30 degrees, to provide a less favorable engagement surface for radially inward deflection, thus rendering it more difficult to remove the wheel cover than to mount the wheel cover.

It should be noted that in the sectional views of FIGS. 3 and 4, the portion of the section taken through the grip ring 40 has been taken through a broken line similar to the line 6—6 of FIG. 5 for the purpose of more clearly illustrating the engagement of the flukes 46 and the outer axial wall 32 of the channel 30.

In FIG. 7 there is depicted a fragmentary sectional view of the wheel cover 10 with the grip ring as first assembled, prior to the initial mounting of a wheel cover 10 to the wheel rim 38. The grip ring 40 has not been fully seated in the channel 30 but has been inserted only partly therein, so that the legs 50 project axially beyond the inner face 14 a distance greater than that required for engaging the latch seat 60 in the draw bead step 62.

Compressive axial force is applied to the outer face 12 of the wheel cover 10 to cause the legs 50 and the cantilever articulated latch 56 to deflect radially inwardly as the wheel cover moves relative to the wheel. Resistance between the engagement leaf 58 and the wheel rim surfaces results in compressive axial pressure between the grip ring 40 and the wheel cover 10 which causes the grip ring to move deeper into the channel 30 until it seats itself at a final depth concomitant with the seating of the latch seat 60 in the draw bead step 62. The legs 50 of the grip ring are thus adjusted in axial length to specifically accommodate the wheel to which the wheel cover 10 is mounted, regardless of axial dimensional variations, within tolerance limits, which may be encountered between individual wheels.

By providing the cantilever articulated latch, spring flexing is permitted in the latch itself, about the curved portion 54 of each leg as well as spring flexing of each leg 50. Such double flexing assures a tight, resilient, snap in engagement of the latch seat 60 in the channel 62 while minimizing radial internal stress forces transmitted to the wheel cover itself. Thus, a relatively thin molded plastic wheel cover may be employed without incurring stress fractures.

Testing was conducted to determine the differences in wheel cover pull off force required utilizing the short and long leg retention system of U.S. Pat. No. 3,876,257 (which grip ring generated stresses which resulted in wheel cover fracture during tramp testing), as compared with the grip ring of the present invention which, due to the reduced internal stresses, did not result in wheel cover fracture during tramp testing.

It was found that utilizing the retention system of U.S. Pat. No. 3,876,257, a pull force of 46.8 kg, applied 180 degrees from the valve stem opening, was required to remove the wheel cover. When utilizing the retention system of the present invention, the required pull off force was 41.8 kg. It is significant to note that although only one-half the number of grip ring legs were employed in the grip ring system of the present invention as opposed to the prior grip ring, only a 5 kg reduction in pull off force resulted and the remaining pull off force was at a level sufficient to preclude inadvertent removal of the wheel cover and sufficient to withstand the ramp testing.

Thus it will be seen that there is provided a grip ring wheel cover retention system which achieves the various aspects, features and considerations of the present invention and which is well adapted to meet the conditions of practical usage.

Having thus described the invention, there is claimed as new and desired to be secured by Letters Patent:

1. A molded plastic wheel cover for a motor vehicle wheel having a wheel rim, the wheel cover including an outer face, an inner face and a grip ring retention system for attachment to the vehicle wheel, the retention system comprising a one piece unitary metal grip ring, the grip ring including a band having a longitudinal edge and a plurality of spaced legs projecting from the longitudinal edge, the wheel cover having an annular channel on the inner face, the annular channel defining a cylindrical plane, means for nonremovably seating the grip ring in the channel, each leg including a first portion extending from the longitudinal edge of the band to a maximum axial length and a second portion comprising articulated cantilever latch means, the latch means being spaced from the cylindrical plane and including a first radially outwardly curved portion extending from the maximum axial length of each leg, the latch means including an engagement leaf extending from the first radially outwardly curved portion radially outwardly and axially inwardly toward the inner face of the wheel cover, a second curved portion comprising a latch seat extending from the engagement leaf and a retraction leaf extending radially inwardly and axially inwardly from the latch seat, the leg and the latch means being of substantially uniform thickness throughout, the latch means being configured for nonscratch engagement with the wheel rim of the vehicle wheel, the wheel rim having a hollow annular draw bead step, the leg being dimensioned for snap fit engagement of the latch seat in the draw bead step when the wheel cover is mounted to the wheel, the band and the first portion of each leg lying within the cylindrical plane when the latch means is not stressed and the wheel cover is not mounted to the wheel.

2. A molded plastic wheel cover for a motor vehicle wheel as constructed in accordance with claim 1 wherein the engagement leaf extends at an angle in the order of 45 degrees relative to the axis of the wheel, whereby engagement between the latch and the wheel rim during mounting of the wheel cover is facilitated.

3. A molded plastic wheel cover for a motor vehicle wheel as constructed in accordance with claim 1 wherein the retraction leaf is positioned at an angle in the order of 30 degrees relative to the wheel axis whereby a mounted wheel cover is not subject to inadvertent removal from a vehicle wheel.

4. A molded plastic wheel cover for a motor vehicle wheel as constructed in accordance with claim 1 wherein the grip ring is formed of stainless steel.

5. A molded plastic wheel cover for a motor vehicle wheel as constructed in accordance with claim 1 wherein each leg has an axial length substantially as great as its width.

6. A molded plastic wheel cover for a motor vehicle wheel as constructed in accordance with claim 1 wherein the legs are evenly spaced about the grip ring, the space between adjacent legs being greater than the width of each leg.

7. A molded plastic wheel cover for a motor vehicle wheel as constructed in accordance with claim 6 wherein the space between adjacent legs is substantially twice the width of each leg.

8. A method of adjusting the axial length of a wheel cover retention leg adapted to mount a wheel cover to a vehicle wheel by engaging a portion of the vehicle wheel, the wheel cover including a cavity and means for fixing the leg relative to the wheel, the means for fixing the leg including means extending into the cavity, the method comprising the steps of:

(a) assembling the wheel cover, the leg and the means for fixing the leg relative to the wheel cover with the means extending into the cavity extending only partially into the cavity such that the leg extends axially from the wheel cover a distance greater than that required for engagement of the leg and the portion of the vehicle wheel, (b) registering the wheel cover with a selected wheel, (c) forcing the fixing means into the cavity by moving the wheel cover toward the wheel, (d) simultaneously seating the fixing means in the cavity and engaging the leg with the portion of the vehicle wheel, and (e) discontinuing the step of moving the wheel cover toward the wheel after the fixing means has been seated in the cavity and the leg has engaged the portion of the vehicle wheel.

9. A method of adjusting the axial length of a wheel cover retention leg adapted to engage a portion of a vehicle wheel in accordance with claim 1 wherein the step of moving the wheel cover toward the wheel includes the step of applying a compressive force against the wheel cover.

10. A nonscratch grip ring for a vehicle wheel cover, the grip ring comprising a one piece metal band of substantially uniform thickness throughout, the band including fluke means adjacent a longitudinal edge of the band for attachment to a wheel cover, the band further including a plurality of spaced legs projecting from the other longitudinal edge, each of the legs being equidistantly spaced from one another and including a first portion lying in a plane of the band and extending in an axial direction away from the other longitudinal edge to a maximum axial length and a second portion spaced from the plane of the band and comprising articulated cantilever latch means, the latch means including a first curved portion extending from the maximum axial length, an engagement leaf extending from the first curved portion outwardly from the plane of the band and axially toward the other longitudinal edge, a curved latch seat extending from the engagement leaf and a retraction leaf extending inwardly toward the plane of the band and axially toward the other longitudinal edge, the latch means being configured free of sharp edges and corners for nonscratch engagement with a vehicle wheel rim having a hollow draw bead step, each leg being dimensioned for snap fit engagement of the latch seat in the draw bead step when the wheel cover is mounted to the wheel, the maximum axial length of each leg being substantially as great as the width of each leg.

11. A grip ring for a wheel cover as constructed in accordance with claim 10 wherein the engagement leaf extends at an angle in the order of 45 degrees relative to the axis of the wheel, whereby engagement between the latch and the wheel rim during mounting of the wheel cover is facilitated.

12. A grip ring for a wheel cover as constructed in accordance with claim 10 wherein the retraction leaf is positioned at an angle in the order of 30 degrees relative to the wheel axis, whereby a mounted wheel cover is not subject to inadvertent removal from a vehicle wheel.

13. A grip ring for a wheel cover as constructed in accordance with claim 10 wherein the legs are evenly spaced about the grip ring, the space between adjacent legs being greater than the width of each leg.

14. A grip ring for a wheel cover as constructed in accordance with claim 13 wherein the space between adjacent legs is substantially twice the width of each leg.

15. A molded plastic wheel cover for a motor vehicle wheel having a wheel rim, the wheel cover including an outer face, an inner face and a grip ring retention system for attachment to the vehicle wheel, the retention system comprising an annular metal grip ring, the wheel cover having an annular channel on the inner face, means for nonremovably seating the grip ring in the channel, the grip ring including a plurality of spaced legs projecting axially outwardly from the inner face, each leg including articulated cantilever latch means, the latch means extending from the maximum axial length of each leg, the latch means including an engagement leaf extending radially outwardly and axially inwardly toward the inner face, a curved latch seat and a retraction leaf extending radially and axially inwardly, the engagement leaf, the seat and the retraction leaf being formed in one piece with the latch means and the leg, the leg and the latch means being of substantially uniform thickness throughout, the latch means being configured for nonscratch engagement with the wheel rim of the vehicle wheel, the wheel rim having a hollow annular draw bead step, the leg being dimensioned for snap fit engagement of the latch seat in the draw bead step when the wheel cover is mounted to the wheel, the grip ring being only partially seated in the channel, the legs projecting axially outwardly from the inner face a distance greater than the axial distance required for engagement of the latch seat with the draw bead step, the means for nonremovably seating the grip ring in the channel including means for permitting the grip ring to move, relative to the wheel cover, axially inwardly toward the inner face and deeper into the channel, responsive to compressive force applied against the outer face when first mounting the wheel cover to a wheel, whereby the grip ring is self seating to adjustably fix the axial length of the legs upon initial installation.

* * * * *